United States Patent [19]

Webber

[11] Patent Number: 5,234,227
[45] Date of Patent: Aug. 10, 1993

[54] MOUNTING FOR AIR BAG ASSEMBLY

[75] Inventor: James L. Webber, Spring Valley, Ohio

[73] Assignee: General Motors Corporation, Detroit, Mich.

[21] Appl. No.: 843,643

[22] Filed: Mar. 2, 1992

[51] Int. Cl.⁵ .............................................. B60R 21/22
[52] U.S. Cl. ..................................... 280/728; 280/732
[58] Field of Search .............. 280/727, 728 R, 728 A, 280/730 A, 730 R, 732, 736, 742, 751

[56] References Cited

U.S. PATENT DOCUMENTS

| | | | |
|---|---|---|---|
| 4,153,273 | 5/1979 | Rusko | 280/728 A |
| 4,915,410 | 4/1990 | Bacheldar | 280/732 |
| 5,064,218 | 11/1991 | Hartmeder | 280/732 |
| 5,088,765 | 2/1992 | Hirashima et al. | 280/732 |
| 5,150,919 | 9/1992 | Sakakida et al. | 280/732 |

FOREIGN PATENT DOCUMENTS 2247214 2/1992 United Kingdom ................ 280/728

Primary Examiner—Jesus D. Sotelo
Assistant Examiner—Stephen P. Avila
Attorney, Agent, or Firm—Charles E. Leahy

[57] ABSTRACT

An inflatable air bag assembly is designed for installation to a vehicle support structure in a variety of differently-configured passenger vehicle instrument panels. This assembly comprises a cylindrical inflator, a steel reaction canister, an air bag and a deployment chute. The canister comprises an elongated U-shaped housing including integral bottom and side walls closed at the ends by end walls defining a rectangular top opening bounded by a mounting flange. The ends of the inflator mount an aluminum lug and collar received in mating mounting apertures in the canister end walls for engagement by steel spring tabs. A retainer ring comprising a peripheral flange, which is secured to the air bag periphery and surrounds an opening corresponding to the canister top opening. An air bag deployment chute is provided which comprises a unitary plastic housing having a bottom opening corresponding to the canister top opening that is bounded by an integral mounting flange. The housing may have any of many different structural configurations which enable connection of a standard canister to an instrument panel opening in many different instrument panel configurations. The mounting flanges all have a plurality of corresponding mounting apertures. Fasteners extend through the mounting apertures into engagement with the canister and chute mounting flanges to clamp the chute, retainer ring, air bag and canister together.

13 Claims, 3 Drawing Sheets

MOUNTING FOR AIR BAG ASSEMBLY

BACKGROUND OF THE INVENTION

This invention relates generally to inflatable restraints for passenger vehicles and, more particularly, to the mounting for an inflatable air bag assembly in a vehicle instrument panel.

Inflatable occupant restraint systems for passengers of vehicles conventionally comprise an air bag assembly which comprises an inflatable bag, an inflator and a housing for the inflator and the air bag. This assembly is mounted in a recess in the instrument panel for front seat passenger use. The housing has a reaction canister lower portion and an upper portion for the air bag which terminates at the instrument panel opening.

The instrument panel opening is conventionally closed by a cover door that can take several forms. In one, the air bag assembly is located behind the vertical face of the instrument panel for deployment through an opening closed by a vertical door. This door may be hinged about its lower edge to the instrument panel to open downwardly to enable deployment of the inflating bag. This door may also comprise door halves which open upwardly and downwardly to enable bag deployment.

The location of the air bag assembly behind and for deployment through the vertical face of the instrument panel suffers the disadvantage of necessitating removal or repositioning of the conventional glove box.

Other mounting arrangements have been developed which locate the air bag assembly in a recess below an opening in the upper surface of the instrument panel. This location eliminates interference with the glove box. Such a mounting may utilize a separate, separable door that is released by air bag inflation upon deployment.

Different vehicles have different instrument panel shapes and structures, which dictate different placements for the air bag assemblies. Thus, conventionally, the air bag housing portions must vary in shape, depending on the location of the air bag assembly relative to the instrument panel housing. This requires that the housing shape be tailored to the particular installation, since locations will vary from vehicle to vehicle. As a result, each air bag assembly is unique.

It would desirable to provide an air bag assembly that has standard parts that can be used in any air bag assembly installation.

It would also be desirable to provide an air bag assembly that is easily adaptable to any air bag assembly location in an economical manner.

SUMMARY OF THE INVENTION

It is therefore an object of this invention to provide an air bag assembly that has standard parts that can be used in any air bag assembly installation.

Another object of this invention is to provide an air bag assembly that is easily adaptable to any air bag assembly location in an economical manner.

In one aspect, this invention features an inflatable air bag assembly for mounting to vehicle support structure in a recess in a passenger vehicle instrument panel in any of a variety of locations. This assembly comprises a cylindrical inflator, a steel reaction canister and means mounting the inflator to the canister. The canister has a closed body with a rectangular top opening bounded by a mounting flange and means for mounting the canister to vehicle support structure with the top opening in a predetermined orientation to, and at a predetermined distance from, the panel opening. The air bag has a peripheral mounting means, and an air bag deployment chute is provided which comprises a unitary plastic housing having a bottom opening corresponding to the canister top opening that is bounded by an integral mounting flange mating with the canister mounting flange. The housing has a structural configuration enabling connection of the canister top opening to the instrument panel opening to provide an unbroken passageway to facilitate air bag deployment. Fastening means mount the deployment chute on the canister by clamping the air bag peripheral mounting means between the chute and canister mounting flanges. With this construction, a deployment chute of any structural configuration can be mounted on the canister, regardless of the canister's orientation to and distance from the panel aperture, so long as the deployment chute includes a bottom opening corresponding to the canister top opening and a mounting flange mating with the canister mounting flange.

In another aspect, this invention features a canister which comprises an elongated U-shaped body including integral bottom and side walls closed at the ends by end walls defining the rectangular top opening and the mounting flange has a plurality of spaced mounting apertures. The deployment chute mounting flange includes a plurality of mounting apertures each corresponding to a canister mounting aperture, and the air bag peripheral mounting means include an air bag retainer ring comprising a peripheral flange which is secured to the air bag periphery, surrounds an opening corresponding to the canister top opening, and has a plurality of mounting apertures each corresponding to a canister mounting aperture. The fastening means extend through the mounting apertures into engagement with the canister and chute mounting flanges to clamp the chute, retainer ring, air bag and canister together.

In yet another aspect, this invention features an inflator which has a mounting rod extending from one end and an end cap on the other end. One of the canister end walls includes a recess receiving the mounting lug, while the other end wall includes an access aperture closed by a plastic wiring protector which receives the end cap and includes a wiring access channel. The inflator includes a flexible ignition control wiring extending through the wire access channel outside the canister.

In still another aspect, this invention features a mounting collar on the inflator end cap and spring tabs about the access aperture which engages the collar. The inflator has a mounting lug which includes an orientation flat and the other end wall of the canister includes a spring tab extending into the hole to engage and grip the orientation flat upon insertion of the rod into the hole. Preferably, the canister is a unitary piece of steel, the inflator is aluminum, and the deployment chute is a unitary piece of plastic.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
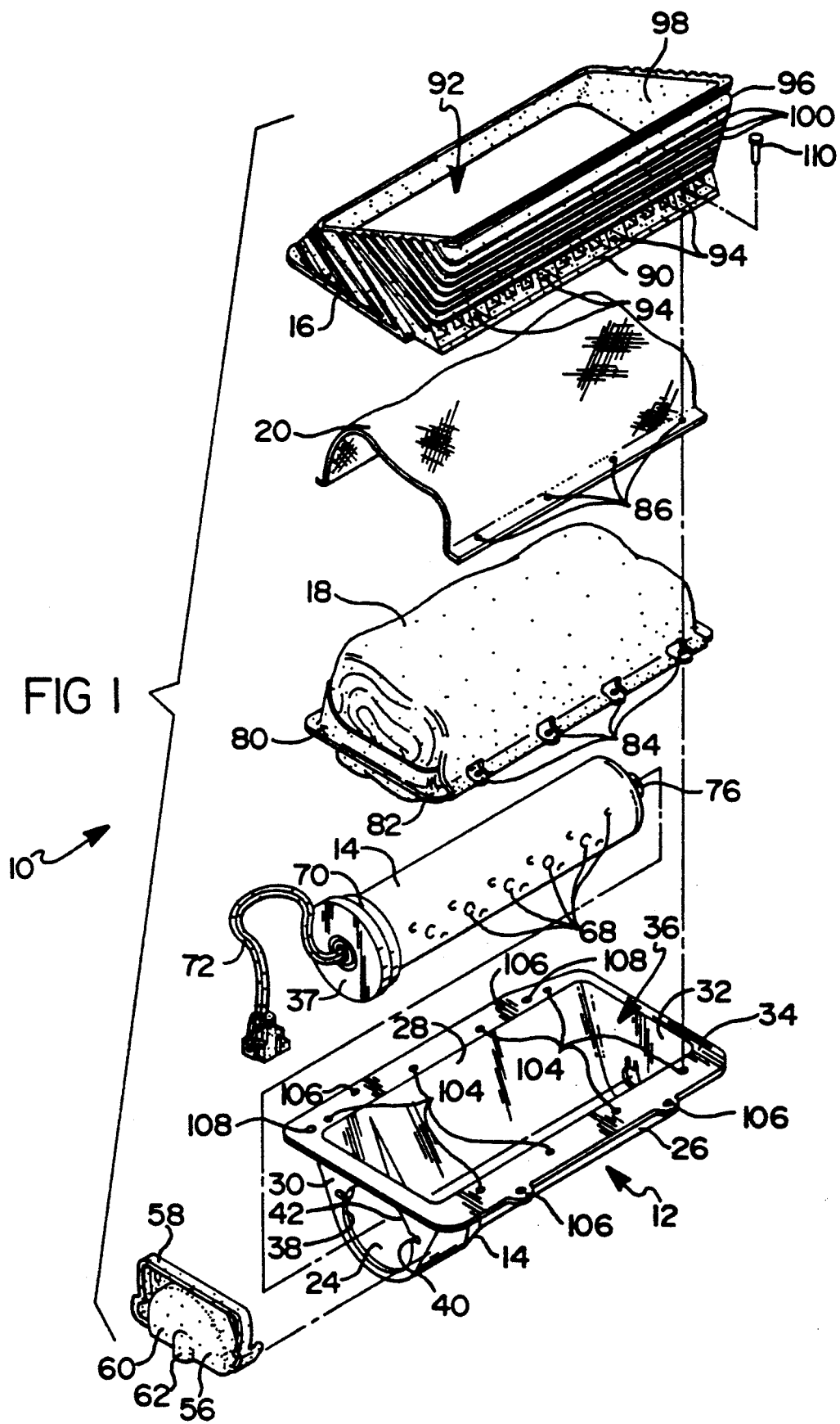
FIG. 1 is an exploded view of an inflatable air bag assembly according to this invention.
Figure 2:
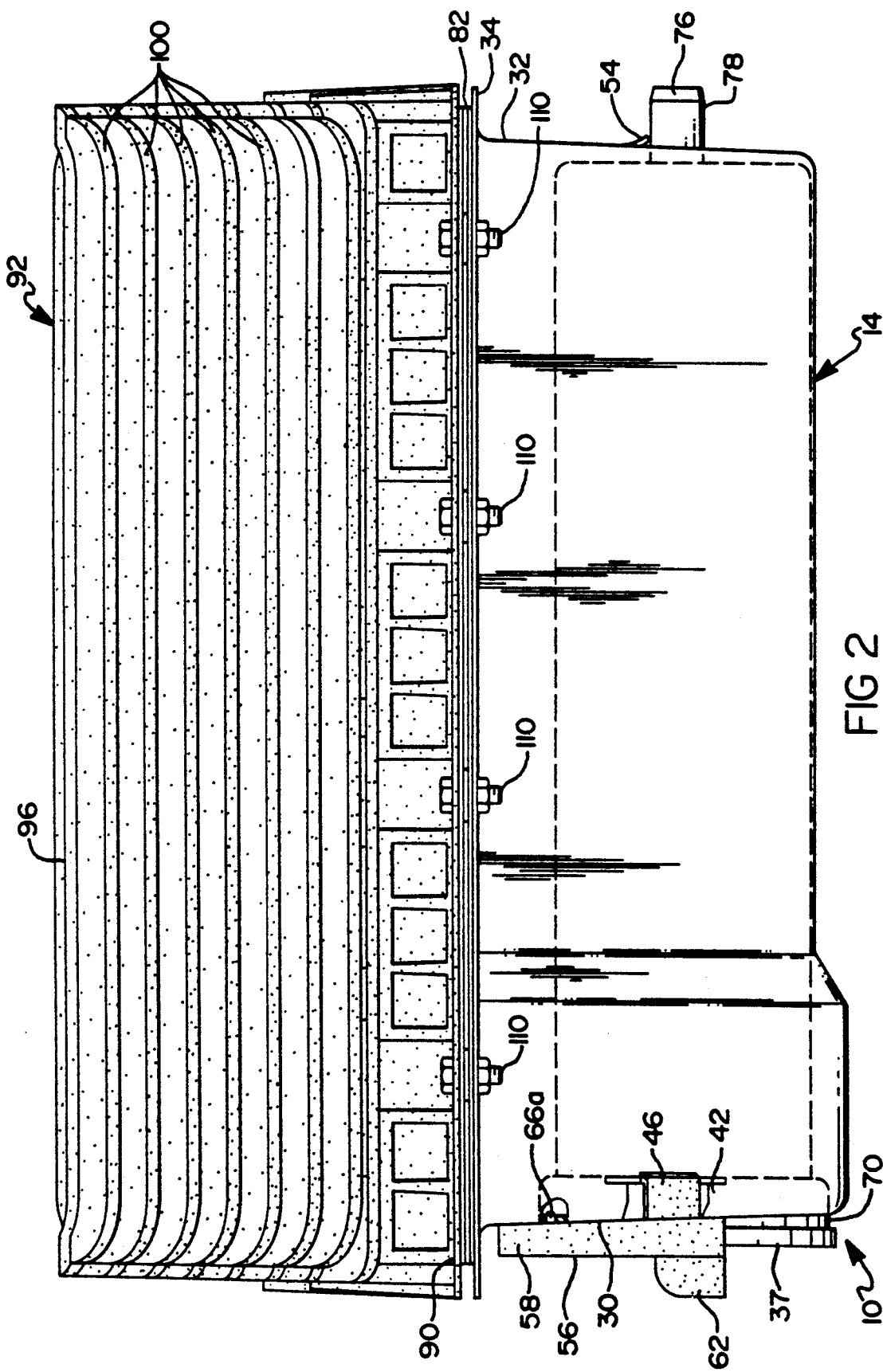
FIG. 2 is a front elevation of the assembly of FIG. 1.

Referring now to FIG. 1 of the drawings, an air bag assembly 10 comprises a deep-drawn steel reaction canister 12, which houses a cylindrical inflator 14. A plastic deployment chute 16 mounts atop canister 12 and confines an air bag 18 having a dust cover 20.

Canister 12 has an elongated U-shaped body comprising a curved bottom wall 24 that terminates in slightly diverging integral side walls 26 and 28. The ends of canister 12 are closed by integral end walls 30 and 32 which, with side walls 26 and 28, terminate in a peripheral flange 34 defining a top opening 36.

Figure 3:
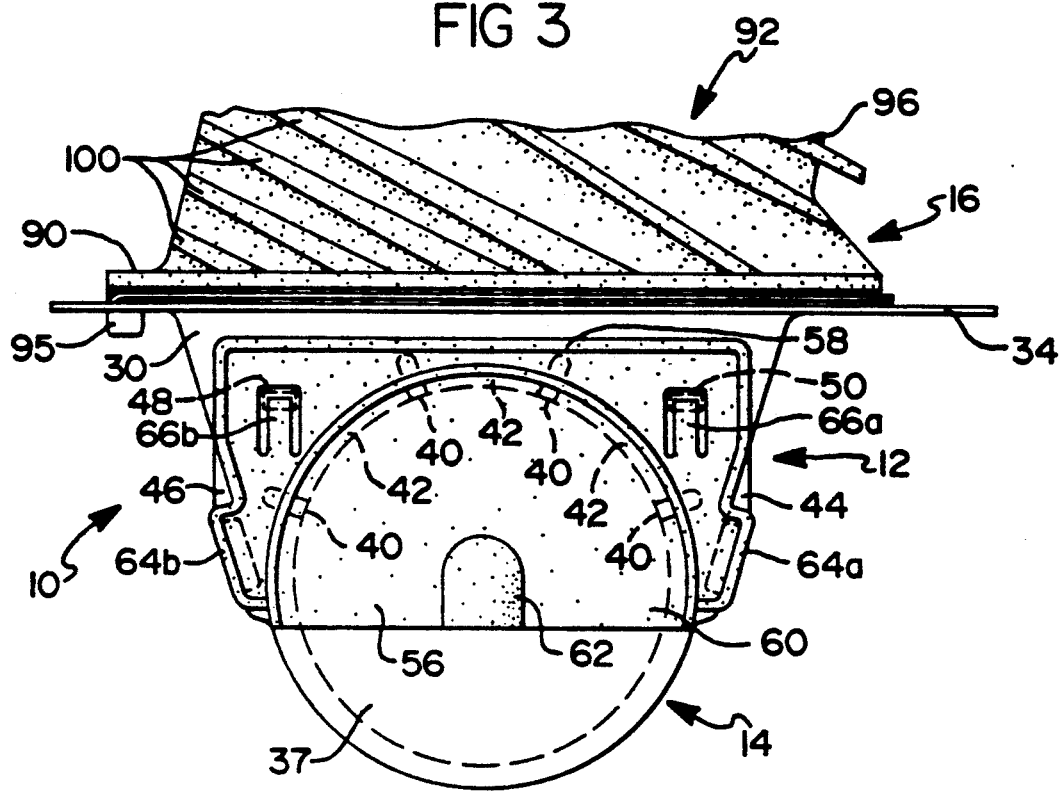
FIG. 3 is a left side elevation of the assembly of FIG. 2.
Figure 4:
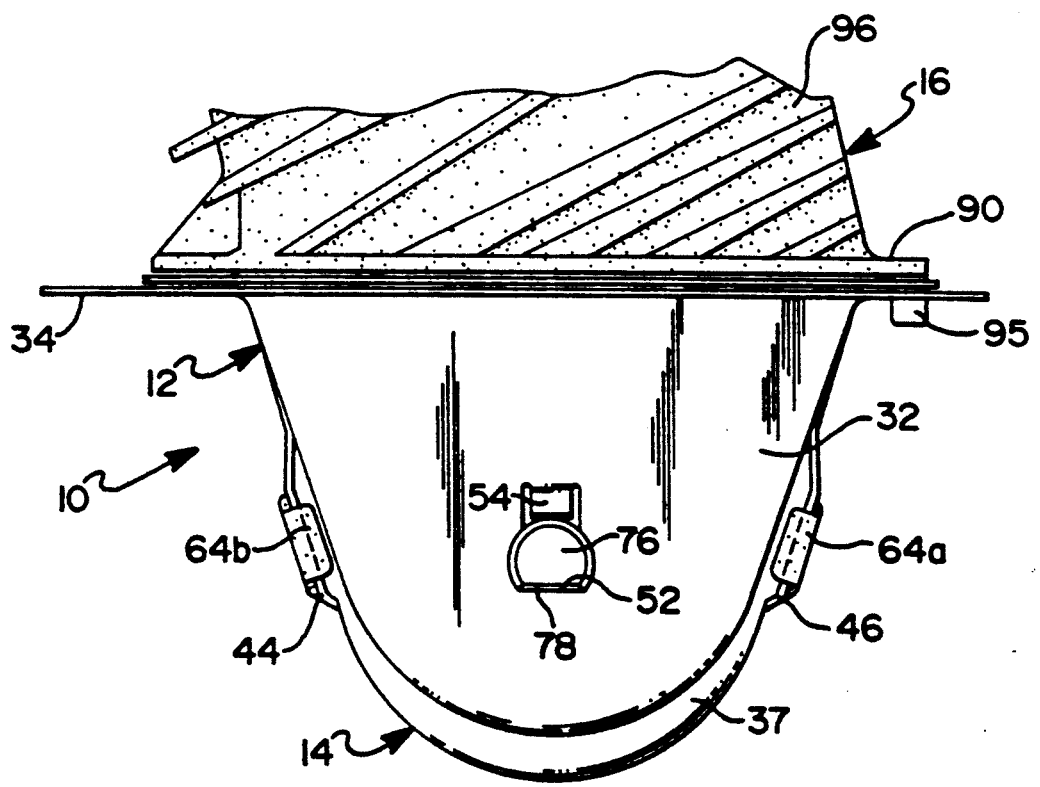
FIG. 4 is a right elevation of the assembly of FIG. 2.

Referring additionally to FIGS. 3, 4 and 5, canister 12 is enlarged at 37 mounted on end wall 30, which includes a circular access aperture 38. Spaced slots 40 are formed in end wall 30 adjacent aperture 38 to define spring tabs 42. Canister side walls 26 and 28 include lanced-out shoulders 44 and 46 located adjacent end wall 30, which has square holes 48 and 50 formed adjacent aperture 38. The other end wall 32 of canister 12 contains a flatted part-circular lug opening 52. A spring tab 54 is formed above, and projects slightly into, lug opening 52.

A plastic end cap 56 includes a peripheral structural rib 58 flanking a central part-cylindrical boss 60, having a protruding open-bottom control wire outlet 62. A pair of integral spring retaining tabs 64a and 64b are formed on the sides of end cap 56 and project forwardly of rib 58. A pair of retainer tabs 66a and 66b are formed adjacent to boss 60.

Inflator 14 comprises an aluminum cylinder having radial gas discharge ports 68. An end cap 70 incorporates a mounting collar 71 slightly larger in diameter than access aperture 38. Control wiring 72 extends from end cap 70 and mounts a terminal connector 74. A flatted part-cylindrical mounting lug 76 having an orientation flat 78 projects from the other end of inflator 14.

Air bag 18 is sewn or otherwise secured to an annular retaining ring 80 having a peripheral mounting flange 82 which includes spaced mounting holes 84. Dust cover 18 is made of paper or thin cloth and includes peripheral mounting holes 86 which correspond to retainer mounting holes 84.

Deployment chute 16 is a unitary piece of plastic having a rectangular mounting flange 90 which defines a bottom opening 92 that mates with canister opening 36. Flange 90 incorporates spaced mounting holes 94, which correspond to mounting holes 84 and 86, and a pair of depending locator tabs 95. Chute 16 is in the form of a truncated rectangular housing 96 having a smooth interior 98 extending upwardly from flange 90.

The exterior of housing 96 comprises a plurality of spaced structural ribs 100. Housing 96 terminates in a rectangular deployment opening 102 configured to mate with a deployment opening (not shown) located in a vehicle instrument panel. The height and shape of the walls of housing 96 and deployment opening 102 are dependent on the location and distance of the air bag assembly 10 relative to the instrument panel deployment opening.

Canister mounting flange 34 incorporates three sets of holes. A first set, or plurality, comprises mounting holes 104 that correspond to the mounting holes 84, 86 and 94 in retaining ring 80, dust cover 20 and deployment chute 16. A second set, or plurality, comprises mounting holes 106 used for mounting the assembly 10 to vehicle structure in a recess in a vehicle instrument panel beneath its air bag deployment opening. The third set comprises two locator holes spaced to receive chute locator tabs 95.

Assembly of the elements comprising air bag assembly 10 will now be described. Inflator 14 is inserted through access aperture 38 into canister 12, with lug 76 entering aperture 52 and engaging tab 54. Lug 76 is forced into aperture 52 to deflect tab 54 outwardly. Simultaneously, mounting cap collar 71 is forced into aperture 38, deflecting spring tabs 42 inwardly. As inflator 14 is inserted, the steel of the deflected tabs 54 and 42 will bite into the softer aluminum of inflator lug 76 and mounting cap collar 71 to secure inflator 14 against removal.

The end cap 60 is then attached to canister end 30 by snapping tabs 64a and 64b over shoulders 44 and 46 and tabs 66a and 66b into holes 48 and 50. Wire 72 is accommodated by wire outlet 62. Inflator 14 is now secured into canister 12, located closely adjacent canister bottom wall, 24 with wire 72 protected during further handling. Because of the configuration of inflator 14 and canister 12, proper orientation of these elements is assured.

Retainer ring 80 with attached air bag 18, dust cover 20, and deployment chute 16 are assembled onto canister flange 34, with mounting holes 94, 86, and 84 aligned with canister mounting holes 104. These elements are then assembled to canister 12, with deployment chute locating tabs 95 inserted into holes 108. The provision of the locating tabs assures that proper assembly orientation is assured. Fasteners 110, in the form of rivets or bolts are inserted through the aligned mounting holes and secured by respective upsetting or by nuts. This secures the air bag assembly together, with deployment chute 16 mounted on canister 12, with air bag 18 securely clamped between. This air bag assembly 10 is then mounted on an appropriate vehicle structure, in a predetermined orientation and at a predetermined distance from an instrument panel air bag deployment opening, via bolts inserted through canister flange mounting holes 106.

This enables adaptability to a plurality of different vehicle instrument panel configurations and mounting arrangements by providing a deployment chute 16 configured to extend from the standard canister 12, as mounted, to the specific opening. The various deployment chutes need only have the same size bottom opening and mounting flange arrangement to mate with canister 12. With this arrangement, a standardized assemblage of canister 12, inflator 14, air bag 18 and dust cover 20 can be used with any deployment chute 16 provided for any specific instrument panel configuration.

While only a preferred embodiment has been illustrated and described, obvious modifications thereof are contemplated within the scope of this invention and the following claims.

I claim:

1. An inflatable air bag assembly for installation to a vehicle support structure in a recess in a passenger vehicle instrument panel which enables air bag deployment through an instrument panel opening, comprising a cylindrical inflator having flexible ignition control wiring extending from one end, a reaction canister having an elongated U-shaped housing comprising integral bottom and side walls closed at the ends by end walls defining a rectangular top opening bounded by a peripheral mounting flange having a plurality of spaced mounting apertures, wherein one of the end walls includes an access aperture and the canister includes means for mounting the canister to vehicle support structure, means mounting the inflator to the canister with the control wiring extending through the access aperture, a retainer ring comprising a peripheral flange surrounding an opening corresponding to the canister top opening and having a plurality of mounting apertures each corresponding to a canister mounting aperture, an air bag having a periphery secured to the retainer ring, an air bag deployment chute comprising a unitary plastic housing having a bottom opening corresponding to the canister top opening and a top opening corresponding to the instrument panel opening; the bottom opening being bounded by an integral flange having a plurality of mounting apertures each corresponding to a canister mounting aperture, and fasteners engaging the deployment chute flange and extending sequentially through the chute mounting apertures, the retainer ring mounting apertures and the canister flange mounting apertures into engagement with the canister mounting flange to clamp the chute, retainer ring, air bag and canister together.

2. The air bag assembly of claim 1, wherein the means for mounting the canister to a vehicle support structure comprise a second plurality of spaced mounting apertures on the mounting flange.

3. The air bag assembly of claim 1, wherein the means mounting the inflator to the canister comprise cooperating means on the inflator ends and on the canister end walls securing the inflator ends to the end walls.

4. The air bag assembly of claim 3, wherein the inflator has an end cap on the one end, and the canister access aperture is closed by a plastic wiring protector which receives the end cap and includes a wiring access channel, enabling extension of the ignition control wiring therethrough.

5. The air bag assembly of claim 4, wherein the inflator has a mounting lug on its other end, and the canister other end wall has a mounting hole receiving the second mounting rod.

6. The air bag assembly of claim 5, wherein the inflator mounting means include an orientation flat on the mounting lug and the other end wall of the canister includes a spring tab extending into the hole to engage and grip the orientation flat upon insertion of the rod into the hole.

7. The air bag assembly of claim 6, wherein the inflator mounting means include an end cap on the collar and peripheral spring tabs about the canister access aperture which engage the collar to secure the inflator to the canister.

8. The air bag assembly of claim 7, wherein the inflator collar and lug are aluminum and the canister tabs are steel.

9. The air bag assembly of claim 1, wherein the canister is a unitary piece of steel and the deployment chute is a unitary piece of plastic.

10. An inflatable air bag assembly for installation to a vehicle support structure in a recess in a passenger vehicle instrument panel which enables air bag deployment through an instrument panel opening, comprising
a cylindrical inflator,
a steel reaction canister having a closed housing with a rectangular top opening bounded by a mounting flange and means for mounting the canister to a vehicle support structure with the top opening in a predetermined orientation to, and at a predetermined distance from, the panel aperture,
means mounting the inflator to the canister,
an air bag having peripheral mounting means,
an air bag deployment chute comprising a unitary plastic housing having a bottom opening corresponding to the canister top opening and being bounded by an integral mounting flange mating with the canister mounting flange, the housing having a structural configuration enabling connection of the canister top opening to the instrument panel opening to provide an unbroken passageway to facilitate air bag deployment, and
fastening means for mounting the deployment chute on the canister by clamping the air bag peripheral mounting means between the chute and canister mounting flanges, whereby a deployment chute of any structural configuration can be mounted on the canister, regardless of the canister's orientation to and distance from the panel aperture, so long as the canister includes a bottom opening corresponding to the canister top opening and a mounting flange mating with the canister mounting flange.

11. The air bag assembly of claim 10, wherein
the canister comprises an elongated U-shaped housing including integral bottom and side walls closed at the ends by end walls defining the rectangular top opening and the mounting flange has a plurality of spaced mounting apertures,
the deployment chute mounting flange includes a plurality of mounting apertures each corresponding to a canister mounting aperture,
the air bag peripheral mounting means include an air bag retainer ring comprising a peripheral flange which is secured to the air bag periphery, surrounds an opening corresponding to the canister top opening, and has a plurality of mounting apertures each corresponding to a canister mounting aperture, and
the fastening means extend through the mounting apertures into engagement with the canister and chute mounting flanges.

12. The air bag assembly of claim 11, wherein the means for mounting the canister to vehicle support structure comprise a second plurality of spaced mounting apertures on the mounting flange.

13. The air bag assembly of claim 11, wherein the inflator mounting means include
an aluminum mounting lug extending from one end of the inflator,
an aluminum mounting collar on the other end of the inflator,
a lug opening in one of the canister end walls receiving the mounting lug and having a steel spring tab engaging the lug,
an access aperture in the other canister end wall receiving the collar, and
a plurality of peripheral spring tabs about the aperture engaging the collar.

* * * * *